US012152607B2

(12) United States Patent
Unterberger et al.

(10) Patent No.: US 12,152,607 B2
(45) Date of Patent: Nov. 26, 2024

(54) BLDC MOTOR WITH HEAT RECOVERY SYSTEM

(71) Applicant: Bleckmann GmbH & Co. KG, Lamprechtshausen (AT)

(72) Inventors: Hubert Unterberger, Bürmoos (AT); Markus Dannenhauer, Bürmoos (AT)

(73) Assignee: Bleckmann GmbH & Co. KG, Lamprechtshausen (AT)

( * ) Notice: Subject to any disclaimer, the term of this patent is extended or adjusted under 35 U.S.C. 154(b) by 281 days.

(21) Appl. No.: 17/383,365

(22) Filed: Jul. 22, 2021

(65) Prior Publication Data

US 2022/0025904 A1 Jan. 27, 2022

(30) Foreign Application Priority Data

Jul. 24, 2020 (EP) ..................................... 20187722

(51) Int. Cl.
*F04D 29/58* (2006.01)
*A47L 15/00* (2006.01)
(Continued)

(52) U.S. Cl.
CPC ...... *F04D 29/5866* (2013.01); *A47L 15/0047* (2013.01); *A47L 15/4214* (2013.01);
(Continued)

(58) Field of Classification Search
CPC ............... F04D 29/5866; F04D 29/007; F04D 29/5873; F04D 29/58; F04D 13/06;
(Continued)

(56) References Cited

U.S. PATENT DOCUMENTS 2,913,988 A * 11/1959 White .................. F04D 29/588
417/357
3,426,691 A * 2/1969 Anderson ............. F04D 13/062
417/370
(Continued)

FOREIGN PATENT DOCUMENTS

CN 107313948 A 11/2017
CN 108054855 A 5/2018
(Continued)

OTHER PUBLICATIONS

EPO; Application No. 20187722.2; European Search Report dated Dec. 16, 2020.

*Primary Examiner* — Peter J Bertheaud
(74) *Attorney, Agent, or Firm* — Fitch, Even, Tabin & Flannery LLP

(57) ABSTRACT

The present invention provides a pump assembly for use in a household appliance comprising a pump, an electric motor having a rotor and a stator and a heat exchanger arranged to be in thermal contact with at least a portion of the stator. There is further provided a heat recovery system for use in a household appliance comprising a main fluid circuit, a fluid reservoir, a heat exchange circuit and a pump assembly for pumping working fluid through the main fluid circuit. The pump assembly comprises an electric motor, a heat exchanger provided in thermal contact with at least a portion of the electric motor, the heat exchanger being configured to transfer heat from the electric motor to a liquid coolant circulating in the heat exchange circuit.

8 Claims, 9 Drawing Sheets

(51) Int. Cl.
*A47L 15/42* (2006.01)
*D06F 39/30* (2024.01)
*F04D 13/06* (2006.01)
*F04D 29/00* (2006.01)
*H02K 1/20* (2006.01)
*H02K 5/20* (2006.01)
*H02K 9/19* (2006.01)
*H02K 9/197* (2006.01)

(52) U.S. Cl.
CPC .......... *A47L 15/4225* (2013.01); *F04D 13/06* (2013.01); *F04D 29/007* (2013.01); *F04D 29/58* (2013.01); *F04D 29/5806* (2013.01); *F04D 29/5813* (2013.01); *F04D 29/5873* (2013.01); *F04D 29/588* (2013.01); *H02K 1/20* (2013.01); *H02K 5/20* (2013.01); *H02K 5/203* (2021.01); *H02K 9/19* (2013.01); *H02K 9/197* (2013.01); *D06F 39/30* (2024.01)

(58) Field of Classification Search
CPC ............. F04D 29/5806; F04D 29/5813; F04D 29/588; A47L 15/0047; A47L 15/4214; A47L 15/4225; H02K 1/20; H02K 5/203; H02K 9/19; H02K 9/197
See application file for complete search history.

(56) References Cited

U.S. PATENT DOCUMENTS

| | | | | |
|---|---|---|---|---|
| 4,480,967 | A * | 11/1984 | Schulze | F04C 15/0096 417/370 |
| 5,509,463 | A * | 4/1996 | Callaway, Sr. | H05B 3/58 165/169 |
| 6,986,648 | B2 * | 1/2006 | Williams | F04D 29/5813 417/370 |
| 7,802,614 | B2 * | 9/2010 | Elnar | H02K 9/227 165/47 |
| 8,823,222 | B2 * | 9/2014 | Lau | H02K 9/227 15/322 |
| 2011/0041705 | A1 * | 2/2011 | Reichl | H05B 3/40 99/323.3 |
| 2020/0106341 | A1 | 4/2020 | Endo et al. | |

FOREIGN PATENT DOCUMENTS

| | | |
|---|---|---|
| CN | 108377063 B | 3/2020 |
| DE | 102014104373 A1 | 10/2015 |
| EP | 0858145 A2 | 8/1998 |
| EP | 3639722 A1 | 4/2020 |

* cited by examiner

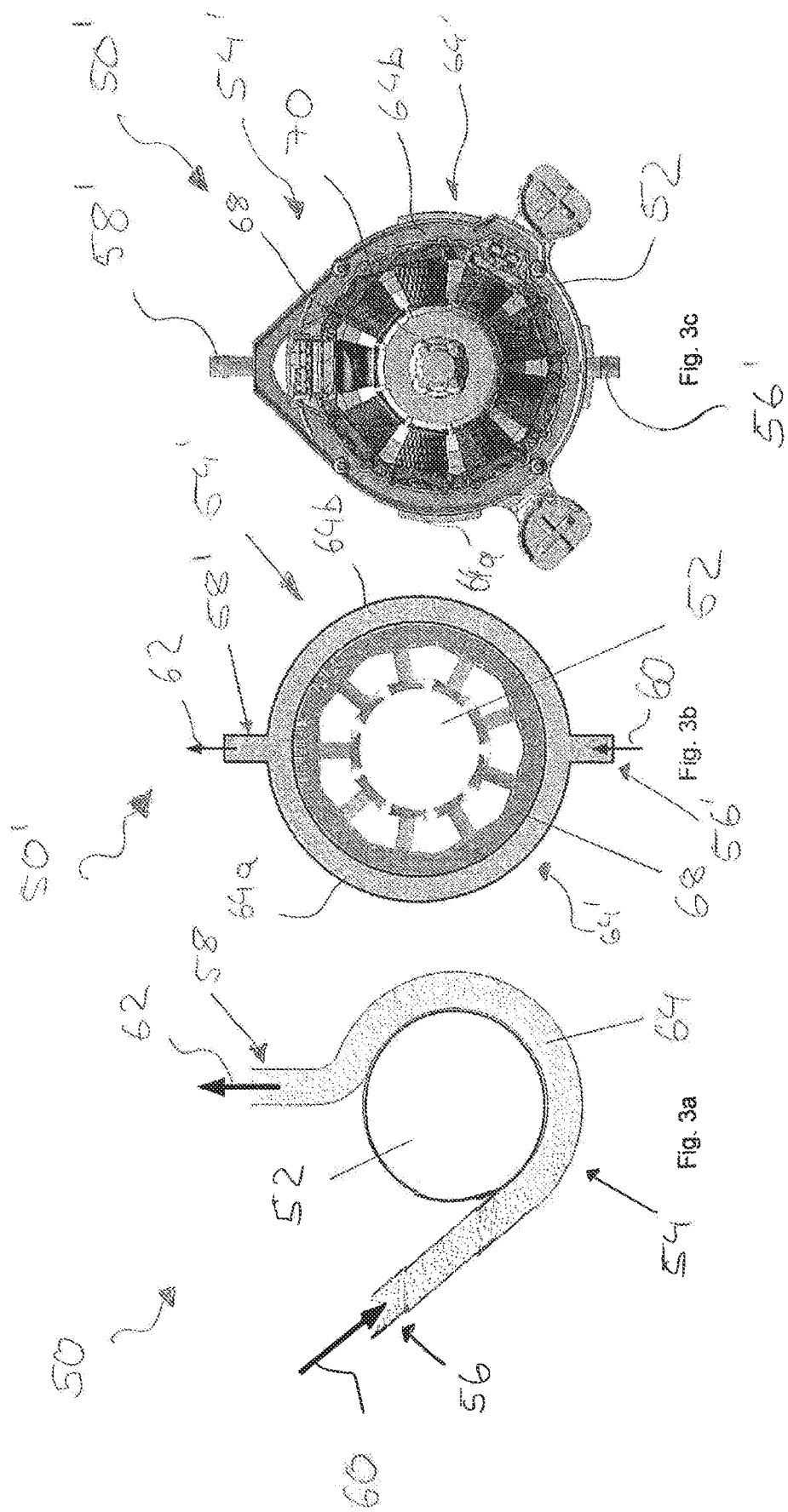

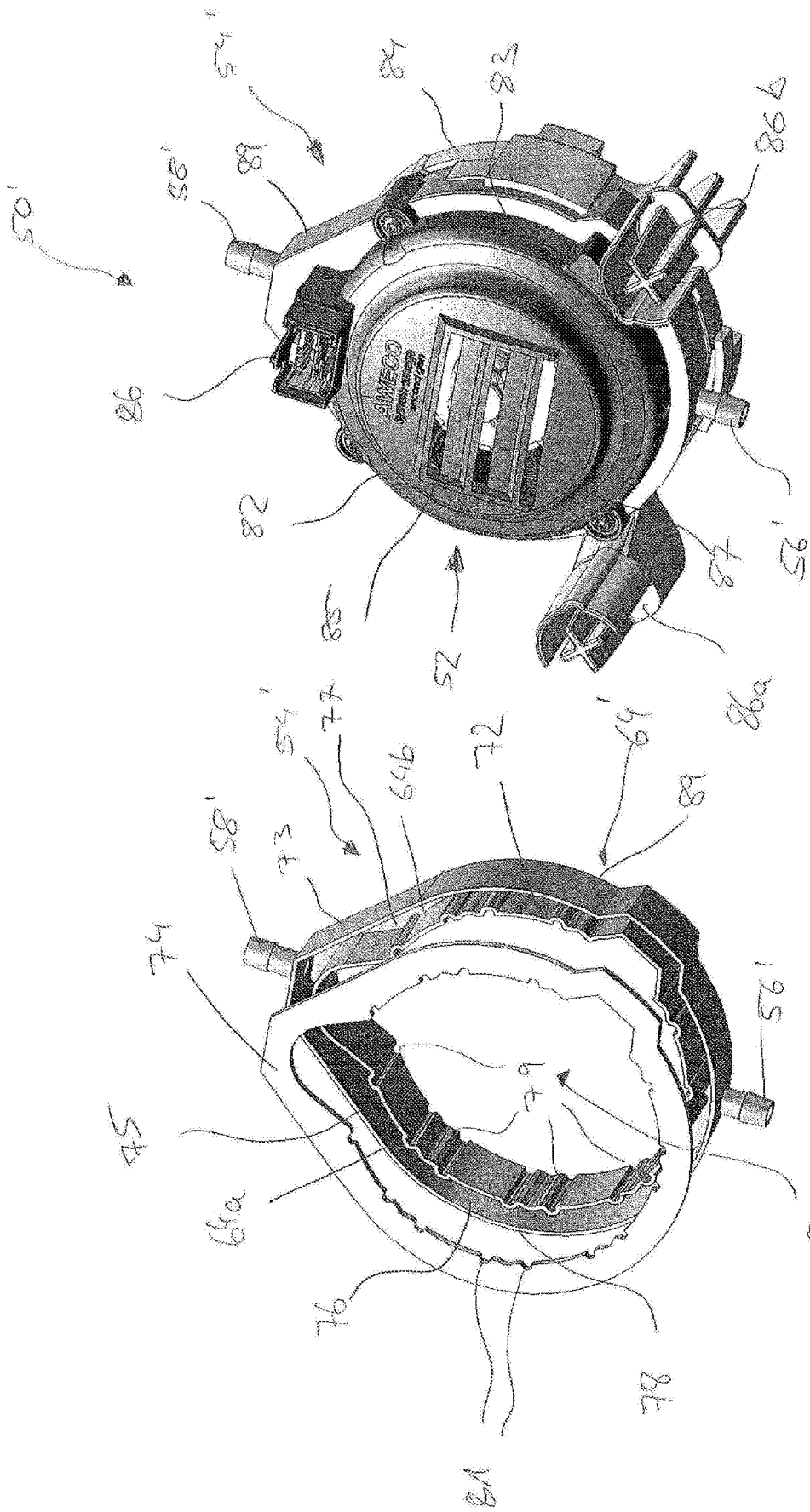

BLDC MOTOR WITH HEAT RECOVERY SYSTEM

CROSS-REFERENCE TO RELATED APPLICATION

The present application claims the benefit of priority of European Patent Application No. 20187722.2 filed on Jul. 24, 2020, the content of which is incorporated herein by reference in its entirety.

FIELD OF THE INVENTION

The present invention relates to the field of household appliances, and in particular to aspects of a heat recovery system for use in a household appliance, such as a pump assembly, and to a method for operating a household appliance comprising a heat exchange circuit.

BACKGROUND ART

In the development of household appliances, as in many other fields, there is an ever increasing need for improving energy efficiency in order to reduce greenhouse gas emissions as well as energy costs for operating these devices. The demands of both consumers and regulatory bodies contribute to these energy efficiency requirements. In particular the European Union is concerned with providing consumers with suitable labels for making an informed purchase decision based on the energy efficiency of a product, for example with EU Regulation 2017/1369, thereby setting standards affecting markets worldwide.

Consumers and manufacturers alike are interested in devices which not only are energy efficient, but also at the same time are available at an affordable price.

It is therefore an object of the present invention to provide affordable solutions for improving the energy efficiency of household appliances, such as dishwashers.

SUMMARY OF THE INVENTION

The present invention addresses the afore discussed needs by providing a heat recovery system for a household appliance, as well as related devices, assemblies and methods according to the following aspects and embodiments.

In a first aspect, a pump assembly for use in a household appliance is provided. The pump assembly comprises at least one pump. Preferably, the pump comprises at least one pumping chamber comprising at least one working fluid receiving port and at least one working fluid discharge port, as well as at least one pumping element provided in the at least one pumping chamber. The pump assembly further comprises an electric motor having a rotor and a stator, preferably a brushless DC (BLDC) motor, wherein the rotor is configured to drive the pump for pumping a working fluid. The pump assembly further comprises at least one heat exchanger comprising at least one coolant inlet, at least one coolant outlet and at least one coolant duct for a liquid coolant extending between the at least one coolant inlet and the at least one coolant outlet, wherein the at least one heat exchanger is arranged to be in thermal contact with at least a portion of the stator to transfer heat from the stator to said liquid coolant.

The pump assembly according to the first aspect advantageously enables to recover waste heat of the electric motor, preferably the stator of the electric motor for further use, thereby allowing to increase energy efficiency of the household appliance. It is further advantageous because the cooling effect of the heat exchanger may allow to increase the power output of a given electric motor, or alternatively to use a smaller electric motor for providing a predetermined power output.

In a preferred embodiment, the coolant duct is arranged to at least partially surround a portion of the stator. Arranging the coolant duct in this manner advantageously increases the amount of surface area available for heat transfer between the stator and the heat exchanger. In a particularly preferred embodiment, the coolant duct forms a substantially annular channel enclosing the stator, i.e. the electric motor is arranged within the heat exchanger such that the coolant duct forms a closed flow path surrounding the stator.

Alternatively or additionally, the coolant duct comprises a first branch and a second branch, wherein each branch surrounds a respective portion of the stator. The coolant duct may therefore advantageously be arranged so as to be in thermal contact with particular portions of the stator, preferably with such portions where a relatively large amount of heat is present.

Alternatively or additionally, the heat exchanger comprises a main body portion providing at least a portion of the coolant duct. Thereby, flexibility for coolant duct design can be advantageously increased, in particular compared to a coolant duct formed by part of the electric motor itself. In a particularly preferred embodiment the main body portion also provides the coolant inlet and the coolant outlet, such as to advantageously reduce the number of parts required for assembling the heat exchanger.

Alternatively or additionally, the main body portion is injection molded. In particularly preferred embodiments the main body portion is injection molded from a thermoplastic polymer. Injection molding, in particular using thermoplastic polymers, may advantageously decrease the production costs of the heat exchanger, especially when produced in large quantities.

Alternatively or additionally, the heat exchanger is provided as a separate unit which is attached to a housing of the electric motor. Such a heat exchanger may advantageously be used to modify existing pump designs, thereby potentially further decreasing production cost.

Alternatively or additionally, the heat exchanger is provided as an integral part of a housing of the electric motor. Integrating the heat exchanger into the housing of the electric motor may advantageously contribute to optimizing a coefficient of the heat transfer between the stator and the coolant duct, thereby potentially further increasing energy efficiency.

Alternatively or additionally, the pump assembly further comprises a control unit provided in thermal contact with the heat exchanger. The control unit can preferably be adapted for controlling operation of the electric motor and/or other parts of the pump assembly and/or the household appliance. Control units, and particularly compact ones as preferred for use in household appliances, also produce heat during operation and typically require cooling for optimal operation. Thus, providing a control unit in thermal contact with the heat exchanger can advantageously be used for cooling the control unit, while at the same time making the heat produced by the control unit available for use by the heat exchanger, thereby potentially further increasing energy efficiency. Moreover, cooling the control unit advantageously allows using smaller and thus potentially cheaper electronic components in the control unit.

In a second aspect, preferably combined with the first aspect, a heat recovery system for use in a household appliance is provided. The heat recovery system comprises a main fluid circuit configured to circulate a working fluid. The heat recovery system further comprises a fluid reservoir configured to store fluid and to supply said fluid to the main fluid circuit. The heat recovery system also comprises a heat exchange circuit provided separate from the main fluid circuit, i.e. the heat exchange circuit and the main fluid circuit are at least temporarily disconnected from each other so as to form independent fluid circuits. In other words, when the main fluid circuit and the heat exchange circuit are at least temporarily disconnected from each other, working fluid circulating in the main fluid circuit and a fluid circulating in the heat exchange circuit do not intermix. The heat exchange circuit is configured to heat fluid stored in the fluid reservoir. The heat recovery system further comprises a pump assembly configured for pumping working fluid through the main fluid circuit. The pump assembly preferably is a pump assembly according to the first aspect of the present invention. The pump assembly comprises at least one pump, at least one electric motor configured to drive the at least one pump, such as a BLDC motor, and a heat exchanger provided in thermal contact with at least a portion of the at least one electric motor, preferably with a stator of the electric motor. The heat exchanger is configured to transfer heat from the electric motor to a liquid coolant circulating in the heat exchange circuit.

A heat recovery system according to the afore described second aspect advantageously enables the use of heat incurring at a portion of an electric motor of a pump assembly for heating fluid stored in a fluid reservoir. The fluid thus preheated to an intermediate temperature advantageously reduces the amount of energy needed for further heating the fluid to a desired temperature, thereby increasing energy efficiency of the household appliance.

In preferred embodiments of the first and/or the second aspect of the present invention, the household appliance is a dishwasher, and the main fluid circuit pumps water between parts of a washing compartment of the dishwasher. Alternatively or additionally, the fluid reservoir is an airgap of the household appliance. In the field of household appliances, an airgap is a means to prevent water circulating in the household appliance, which inevitably becomes contaminated during operation of the household appliance, for example by food particles washed off of dishes, from entering the freshwater supply. Such water is also referred to as graywater.

Alternatively or additionally, the working fluid circulating in the main fluid circuit is graywater and the fluid stored in the fluid reservoir is freshwater supplied from a freshwater source. In such embodiments, freshwater is reclassified as graywater once it has entered the main fluid circuit. As applies to any embodiment of the present invention, the working fluid is therefore differentiated from the fluid stored in the reservoir primarily by its presence in the main fluid circuit. In other words, the fluid stored in the fluid reservoir may be the same type of fluid as the working fluid, such as water, but is differentiated from the working fluid by the fact that it has not or not yet been flowing through the main fluid circuit.

Alternatively or additionally, the heat recovery system comprises at least one fluid control means, preferably a valve, configured to prevent working fluid circulating in the main fluid circuit to mix with liquid coolant circulating in the heat exchange circuit. Thereby, the risk of contamination of liquid coolant circulating in the heat exchange circuit with working fluid circulating in the main fluid circuit, and vice versa, is advantageously reduced.

Alternatively or additionally, the fluid reservoir has a main fluid inlet for receiving fluid from a fluid source, and a main fluid outlet for supplying fluid to the main fluid circuit. In other words, the fluid reservoir, which is not a part of the main fluid circuit, i.e. does not form a part of the flow path of working fluid circulating in the main fluid circuit, connects to the main fluid circuit via the main fluid outlet for supplying fluid thereto.

Alternatively or additionally, the fluid reservoir is further configured to supply fluid stored therein to the heat exchange circuit. Preferably, the fluid reservoir stores a single type of fluid, which is supplied to the main fluid circuit as well as to the heat exchange circuit. In other words, the single type of fluid stored in the fluid reservoir is liquid coolant.

Alternatively or additionally, the fluid reservoir forms part of the heat exchange circuit, i.e. the flow path of liquid coolant circulating through the heat exchange circuit passes through the fluid reservoir. In other words, the fluid stored in the fluid reservoir circulates through the heat exchange circuit. Thereby, the fluid in the fluid reservoir is advantageously heated directly in the heat exchanger, reducing the need for intermediate means for transferring heat from the heat exchange circuit to the fluid stored in the fluid reservoir. Preferably, the fluid reservoir is provided with a secondary fluid outlet for supplying fluid stored therein to the heat exchange circuit, and provided with a secondary fluid inlet for receiving heated fluid from the heat exchange circuit. More preferably, the secondary fluid outlet is provided at a lower portion of the fluid reservoir. It is additionally or alternatively preferred that a secondary fluid inlet is provided at an upper portion of the fluid reservoir.

Alternatively or additionally, circulation of the liquid coolant in the heat exchange circuit is a free convective flow, which can also be referred to as natural convection. For the purposes of the present application, the term free convective flow shall express that the circulation of liquid coolant through the heat exchange circuit is driven by a temperature gradient along the heat exchange circuit. In other words, in embodiments where circulation of liquid coolant in the heat exchange circuit is a free convective flow, the heat exchange circuit does not comprise a pump or any other equivalent means for driving the flow of liquid coolant. Such embodiments are particularly advantageous, because the absence of an additional pump for the heat exchange circuit further contributes to the energy efficiency of the household appliance.

Alternatively or additionally, the fluid stored in the fluid reservoir for being supplied to the main fluid circuit and/or to the heat exchange circuit, and the liquid coolant circulating in the heat exchange circuit, are the same fluid, preferably water.

In a third aspect of the present invention, preferably combined with the first and/or the second aspect of the present invention, a method is provided for operating a household appliance comprising a main fluid circuit, a heat exchange circuit and a fluid reservoir connected to the main fluid circuit and the heat exchange circuit. The method comprises the step of providing a predetermined amount of water to the fluid reservoir for temporary storage, the step of preheating the water temporarily stored in the fluid reservoir to an intermediate temperature, and the step of supplying at least a portion of the preheated water to the main fluid circuit. The step of preheating is performed by circulating at least a portion of the water stored in the reservoir through a heat exchange circuit.

A fourth aspect of the present invention, preferably combined with any of the first, second or third aspect of the present invention, relates to the use of a watercooled electric motor, such as a BLDC motor, for the manufacture of a household appliance. Using a watercooled electric motor for manufacturing a household appliance advantageously allows to use a cooler of the watercooled electric motor as a heat exchanger for any of the afore described aspects.

Further aspects, advantages and additional or alternative embodiments of the present invention will be described in relation to the appended figures. It has to be understood that additional or alternative features described in reference to a particular aspect of the present invention are not limited to said aspect, but can form part of any other aspect of the present invention.

Expressions such as "up", "down", "above", "below", "on top", "beneath" or analogous expressions for a relative spatial position along a vertical or horizontal axis of a coordinate system are, if not indicated otherwise, defined relative to a viewer's perspective on the drawings. The depicted devices' orientations coincide, if not indicated otherwise, with a mounting orientation in the household appliance during operation thereof, wherein the household appliance is typically set up on a floor. Consequently, if not indicated otherwise, expression such as "down", "below", "beneath" or analogous expressions relate to a relative position closer to the floor, and "up", "above", "on top" or analogous expressions relate to a relative position further away from the floor.

Expressions such as "in front", "behind", "left" and "right" or analogous expressions for a spatial position relative to a viewer are defined relative to the viewer's perspective view on the drawings, wherein "in front" or analogous expressions relate to a relative position closer to the viewer, and "behind" or analogous expressions relate to a relative position further away from the viewer.

BRIEF DESCRIPTION OF THE DRAWINGS

FIG. 3a is a schematic view of an embodiment of a pump assembly according to the present invention;

FIG. 3b shows a schematic view of an alternative embodiment of a pump assembly according to the present invention;

FIG. 3c is a detailed view of the pump assembly shown in FIG. 3b;

FIG. 4a shows a heat exchanger according to the present invention, suitable for use with a pump assembly according to the present invention, in an exploded view;

FIG. 4b depicts a detailed view of an embodiment of a pump assembly according to the present invention, which comprises the heat exchanger of FIG. 4a;

DETAILED DESCRIPTION

Figure 1:
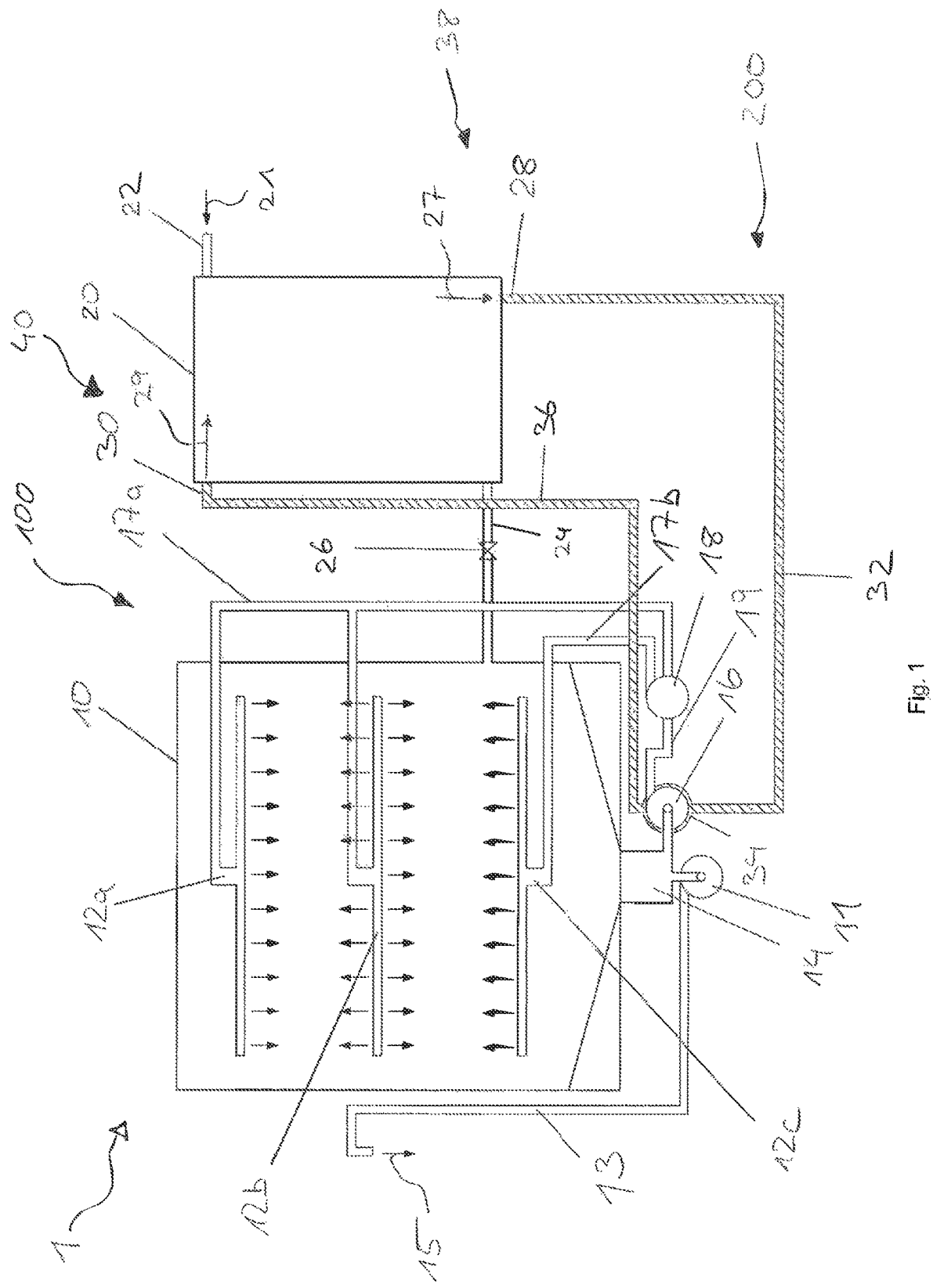
FIG. 1 shows an embodiment of a heat recovery system according to the present invention.
Figure 2:
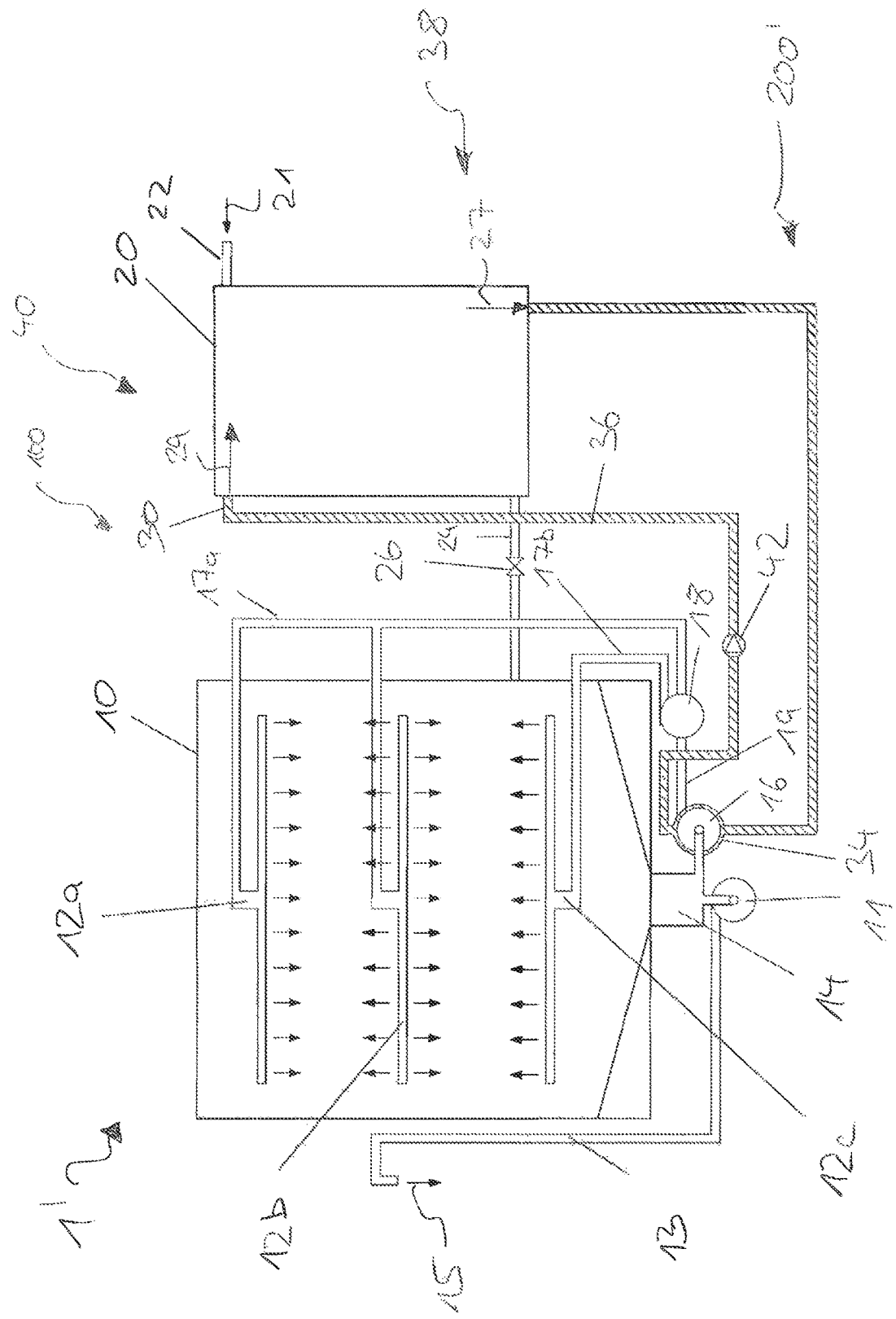
FIG. 2 depicts an alternative embodiment of a heat recovery system according to the present invention.

In the following, further aspects, advantages and alternative or additional embodiments of the present invention are described in relation to FIGS. 1 through 9. It has to be understood that while in particular FIGS. 1 and 2 depict aspects of the present invention employed in a dishwasher, the afore described aspects and embodiments as well as the embodiments described in the following are not limited to use in a dishwasher. The present invention in all its aspects and embodiments is likewise applicable in any other suitable type of household appliance, in particular to washing machines.

FIG. 1 shows a schematic representation of a dishwasher 1, comprising a dishwashing compartment 10 and an airgap 20. A plurality of spray arms, in the depicted embodiment an upper spray arm 12a, a central spray arm 12b and a bottom spray arm 12c, are provided in dishwashing compartment 10 for spraying dishes (not depicted) located in dishwashing compartment 10 with water. In FIG. 1, water exiting spray arms 12a, 12b, 12c is indicated by a plurality of arrows.

A sump 14 is located at the bottom of dishwasher 1, so that water sprayed into dishwashing compartment 10 by arms 12a, 12b, 12c eventually gathers therein. Sump 14 is connected to a circulation pump 16, which pumps water gathered in sump 14 to upper and central spray arms 12a, 12b via an upper riser pipe 17a, and to lower spray arm 12c via a lower riser pipe 17b. In the depicted embodiment, circulation pump 16 is connected to a diverter 18 via a connector pipe 19. Diverter 18 diverts a first stream of water to upper riser pipe 17a and a second stream of water to lower riser pipe 17b. During operation of dishwasher 1, water is continuously circulated through washing compartment 10, sump 14, circulation pump 16, connector pipe 19, diverter 18, lower and upper riser pipes 17a and 17b and upper, central and bottom spray arms 12a, 12b and 12c, thereby forming a main fluid circuit 100 of dishwasher 1.

Airgap 20 comprises a main fluid inlet 22 and a main fluid outlet 24. Main fluid inlet 22 is connectable to a freshwater source (not depicted), such as a household water tap, for receiving freshwater as indicated by arrow 21. Main fluid outlet 24 is connected to dishwashing compartment 10 of main fluid circuit 100 for supplying freshwater stored in airgap 20 to main fluid circuit 100 when needed. Supply of freshwater from airgap 20 to main fluid circuit 100 is controlled by valve 26, which is default closed. In other words, in the default state of dishwasher 1, no fluid bearing connection exists between airgap 20 and main fluid circuit 100. Such a fluid bearing connection between airgap 20 and main fluid circuit 100 is only temporarily established by opening valve 26, which is controlled by a control unit (not depicted) of dishwasher 1. A working fluid circulating in main fluid circuit 100 of the depicted embodiment is water. More particularly, as discussed above, it can be referred to as graywater. Freshwater stored in airgap 20 is reclassified as graywater once it has passed valve 26.

Dishwasher 1 further comprises a drainage pump 11 connected to sump 14 so as to drain water from main fluid circuit 100 via a drainage pipe 13 to an external drainage (not depicted) as indicated by arrow 15.

Airgap 20 further comprises a secondary fluid outlet 28 and a secondary fluid inlet 30. Secondary fluid outlet 28 and secondary fluid inlet 30 are, in this order, connected by a supply line 32, heat exchanger 34 and a return line 36. Therefore, water stored in airgap 20 may enter supply line 32 via secondary fluid outlet 28 as indicated by arrow 27, then flow through heat exchanger 34 and back toward airgap 20 via return line 36, so as to reenter airgap 20 via secondary fluid inlet 30 as indicated by arrow 29. The annular connection of airgap 20, supply line 28, heat exchanger 32, and return line 36 therefore forms a secondary fluid circuit 200, also referred to as heat exchange circuit 200. Due to the default closed state of valve 26, main fluid circuit 100 and heat exchange circuit 200 are two separate fluid circuits, i.e. there is no fluid bearing connection therebetween. For illustrative purposes and distinction from main fluid circuit 100, all fluid bearing components of heat exchange circuit 200, with the exception of airgap 20, are marked by hatching of diagonal lines in FIGS. 1 and 2.

As depicted inter alia in FIG. 1, heat exchanger 34 forms an annular flow path enclosing circulation pump 16, which comprises an electric motor, such as a BLDC motor, having a rotor and a stator. During operation of circulation pump 16, the electric motor thereof inevitably converts a portion of the electric energy supplied thereto to waste heat. Heat exchanger 34 is provided in thermal contact to the electric motor of circulation pump 16, so that heat can be transferred between water flowing through heat exchanger 34 and the electric motor of circulation pump 16. Heat exchange circuit 200 is configured such that, during operation of dishwasher 1, heat flows from the electric motor of circulation pump 16 to water flowing in heat exchanger 34, subsequently transporting at least a portion of the waste heat incurring at circulation pump 16 to airgap 20.

A typical dishwashing cycle is performed at temperatures between 30° C. and 90° C., whereas freshwater supplied from a freshwater supply is typically provided at lower temperatures. Therefore, dishwashers require heating elements provided at a suitable location in their main fluid circuits, in the embodiment of FIG. 1 for example in sump 14. Moreover, a typical dishwashing cycle comprises a number of subsequent sub cycles. Thus, while a first amount of water is circulating through the main fluid circuit of the dishwasher, a second amount of water is temporarily stored in the airgap for being supplied to the main fluid circuit during the appropriate subsequent sub cycle of the dishwashing cycle. Providing dishwasher 1 with heat exchange circuit 200 therefore advantageously enables to preheat water stored in airgap 20 prior to being supplied to main fluid circuit 100. Therefore, the amount of energy needed to be supplied to main fluid circuit 100 to heat the water circulating therein to its final desired temperature is reduced. The present invention is particularly advantageous in that preheating is performed using waste heat incurring at circulation pump 16, therefore increasing energy efficiency of the overall system.

In the particularly preferred embodiment of FIG. 1, heat exchange circuit 200 is configured to be driven by a free convective flow, i.e. without the need for a pump, thereby further increasing the energy efficiency of the system. To this end, secondary fluid outlet 28 is provided at a lower portion 38 of airgap 20 and secondary fluid inlet 30 is provided at an upper portion 40 of airgap 20. Natural convection in airgap 20 will lead to lower temperature—and thus higher density—water flowing toward and accumulating in lower portion 38. Likewise it will lead to higher temperature—and thus lower density—water flowing toward and accumulating in upper portion 40. Locating secondary fluid outlet 28 at lower portion 38 therefore aids in ensuring that lower temperature water of airgap 20 instead of higher temperature water enters supply line 32. Moreover, water pressure in lower portion 38 is higher than in upper portion 40, therefore naturally urging water at lower portion 38 to enter supply line 32.

As depicted inter alia in FIG. 1, the volume of airgap 20 is large compared to the volume of fluid present in the remaining parts of heat exchange circuit 200, i.e. in supply line 32, heat exchanger 34 and return line 36. Thus, a flow velocity of water entering airgap 20 through secondary fluid inlet 30 as indicated by arrow 29, and a flow velocity of water exiting airgap 20 through secondary water outlet 28 as indicated by arrow 27 are also comparatively small. Consequently, even though airgap 20 is part of the flow path of water circulating through heat exchange circuit 200, the afore described natural temperature distribution in airgap 20 is not significantly disturbed by water circulating in heat exchange circuit 200. Optionally, in the depicted and all other embodiments of the present invention, guide vanes (not depicted) may be provided in airgap 20 for guiding circulation therein.

Moreover, supply line 32 connects to a lower end of heat exchanger 34, and return line 36 connects to an upper end of heat exchanger 34. The increase in temperature experienced by water in heat exchanger 34 leads to a decrease in density, therefore leading to a suction effect enacted upon water in supply line 32. Together with the above described pressure difference between secondary fluid outlet 28 and secondary fluid inlet 30, a flow through heat exchange circuit 200 in the direction as indicated by arrows 27, 29 is ensured.

FIG. 2 depicts another embodiment of a dishwasher 1' incorporating aspects of the present invention. Dishwasher 1' of FIG. 2 is substantially identical to dishwasher 1 of FIG. 1, as apparent from the use of the same reference signs in FIG. 2 for the features described above in conjunction with FIG. 1. Dishwasher 1' differs from dishwasher 1 in that its heat exchange circuit 200' further comprises a coolant pump 42. A dedicated coolant pump 42 may be for example advantageous in cases, in which a natural convective flow in heat exchange circuit 200 is not sufficient for the desired cooling effect of circulation pump 16 and/or the desired heating effect of fluid in airgap 20.

Optionally, in the depicted and all other embodiments of the present invention, supply line 32 and return line 36 are connected by an intermediate member so that fluid circulating in heat exchange circuit 200, 200' does not mix with fluid stored in airgap 20. In other words, in these optional embodiments, heat exchange circuit 200, 200' forms a closed fluid circuit without any fluid bearing connection to airgap 20, with a portion of heat exchange circuit 200, 200' arranged in airgap 20—e.g. the aforementioned intermediate member. The portion of heat exchange circuit 200, 200' arranged in airgap 20 preferably forms a second heat exchanger, configured to exchange heat between a fluid circulating in heat exchange circuit 200, 200' and a fluid stored in airgap 20. In general, and particularly useful for the purposes of describing these optional embodiments, the fluid circulating in heat exchange circuit 200, 200' can be referred to by the term coolant, so as to distinguish from the liquid stored in airgap 20. The distinctive terminology also applies in cases, in which coolant and fluid in airgap 20 are the same type of fluid, such as water. Providing heat exchange circuit 200, 200' in the afore described way may advantageously enable to use a coolant that is a different fluid than that stored in airgap 20. For example, the coolant may be chosen according to its heat transfer properties. It is particularly preferred that the coolant is a liquid coolant, it has to be understood however that a gaseous coolant may be used alternatively. Moreover, such a design may advantageously reduce the risk of contamination of fresh water stored in airgap 20 by contaminants present in heat exchange circuit 200, 200'.

A comparative example of a dishwasher according to the present invention has been analyzed to determine its energy-saving potential during a representative wash cycle duration of 222 min. The parameters of the analyzed dishwasher of the present invention and the resulting energy-saving are provided in the following table:

| Power consumption of BLDC motor | $P_N$ = 80 W |
|---|---|
| Stator waste heat | $P_{stator}$ = 16 W |
| Effective heat exchange factor | 50% |
| Resulting heat flux transferred to water in heat exchange circuit | 8.0 W |
| Amount of water in airgap | 2.0 l |
| Initial temperature of water in airgap | $T_{W, initial}$ = 15.0° C. |
| Final temperature of water in airgap | $T_{W, final}$ = 27.7° C. |
| Resulting energy saving | 107 kJ/29.6 Wh |

FIGS. 3a, 3b and 3c depict embodiments of a pump assembly according to the present invention. FIG. 3a provides a schematic representation of a pump assembly 50 comprising a pump 52 configured for pumping a working fluid, and a heat exchanger 54 arranged to be in thermal contact with at least a portion of pump 52. Heat exchanger 54 is formed by a pipe-like element partially wound around pump 52. Heat exchanger 54 comprises a coolant inlet 56 at which liquid coolant enters heat exchanger 54 as indicated by arrow 60, and a coolant outlet 58 at which liquid coolant exits heat exchanger 54 as indicated by arrow 62. Extending between coolant inlet 56 and coolant outlet 58 is a coolant duct 64 along which liquid coolant flows through heat exchanger 54.

Pump 52 comprises an electric motor (not depicted in FIG. 3a), preferably a BLDC motor for driving a pumping element (not depicted in FIG. 3a) arranged in a pumping chamber (not depicted in FIG. 3a) of pump 52. Heat exchanger 54 is arranged around pump 52, so that it contacts portions thereof that produce relevant amounts of heat. A particularly preferred portion of pump 52 to be contacted by heat exchanger 54 is a portion at which a stator of the electric motor is located. The pumping chamber further comprises a working fluid receiving port and a working fluid discharge port (not depicted).

FIG. 3b shows a pump assembly 50', similar to pump assembly 50 of FIG. 3a. Pump 52 of pump assembly 50' is substantially identical to pump 52 of pump assembly 50. FIG. 3b further shows the stator, indicated by reference number 68, of the electric motor of pump 52. Heat exchanger 54' differs from heat exchanger 54 in that coolant duct 64' fully encloses pump 52. As can be inferred from FIG. 3b, depicted stator 68 is a round type stator arranged to form an outer circumferential portion of pump 52. Coolant duct 64' forms a substantially annular channel arranged immediately adjacent and in direct contact with a circumferential portion of pump 52 formed by stator 68. Thereby, a large contact area is provided between coolant duct 64' and an outer circumferential surface of a portion of pump 52 belonging to stator 68, along which heat from stator 68 can transfer to coolant flowing through coolant duct 64'.

In the embodiment of FIG. 3b, coolant duct 64' branches off into a first branch 64a and a second branch 64b downstream of coolant inlet 56'. First branch 64a is a substantially semicircular pipe segment arranged to enclose a first half of pump 52, likewise second branch 64b is a substantially semicircular pipe segment arranged to enclose a second half of pump 52. First branch 64a and second branch 64b rejoin upstream of coolant outlet 58'. In other words, the flow of coolant entering heat exchanger 54' through coolant inlet 56' is divided into two parallel coolant streams, one through each of the first and second branches 64a, 64b, before rejoining downstream of coolant outlet 58' through which the entire coolant stream exits heat exchanger 64'.

As depicted in FIG. 3b, coolant inlet 56' is arranged at a lower portion of heat exchanger 54', and coolant outlet 58' is located at an upper portion of heat exchanger 54'. In this manner, a free convective flow through an attached fluid circuit, such as discussed above in conjunction with heat exchange circuit 200, 200', may be facilitated.

FIG. 3c provides a detailed depiction of pump assembly 50' schematically depicted in FIG. 3b. As can be inferred from FIG. 3c, a rotor housing 70 is provided at a central portion of pump 52 so as to be fully surrounded by stator 68. A rotor enclosed by rotor housing 70 is configured to drive the pumping element of pump 52. In particular, the rotor drives a shaft (not depicted) connected to the pumping element.

Pump assemblies 50 and 50' of FIGS. 3a, 3b and 3c are particularly suitable for use in a heat recovery system of the second aspect of the present invention, in particular in dishwashers 1, 1' of FIGS. 1 and 2. In such an application, heat exchanger 54, 54' is part of a heat exchange circuit, and preferably corresponds to heat exchanger 34. Pump 52 on the other hand is part of a main fluid circuit with a working fluid circulating therein, and preferably corresponds to circulation pump 16. When employed in the aforementioned manner, coolant inlet 56, 56' connects to supply line 32, and coolant outlet 58, 58' connects to return line 36. Likewise, the working fluid receiving port of pump 52 connects to sump 14, and the working fluid discharge port connects to connector pipe 19.

In the afore described embodiments depicted in FIGS. 3a through 3c, coolant ducts 64, 64' form closed channels so that coolant flowing through heat exchanger 54, 54' is separated from stator 68 of the electric motor. In other words, stator 68 is not in direct contact with coolant flowing through heat exchanger 54, 54'. Thermal contact between stator 68 is provided by any number of intermediate parts, such as a housing of pump 52 and an outer surface of coolant duct 64, 64'. Preferably, thermal contact is enhanced by intermediate heat transfer layers of suitable conductive material, for example between a housing of pump 52 and the outer surface of coolant duct 64, 64'.

It has to be understood however, that it is within the scope of all aspects of the present invention that coolant in the coolant duct is in direct contact with a stator of an electric motor. In these alternative embodiments, a coolant duct is for example formed within a housing of the stator of the electric motor.

FIG. 4a provides an exploded view of heat exchanger 54' of FIG. 3c. As can be inferred from FIG. 4a, heat exchanger 64' is formed of an assembly of two parts: a main body 72 and a substantially flat coolant duct covering 74. Main body 72 is a single unitary piece which provides coolant inlet 56' and coolant outlet 58', as well as an annular open channel 76.

An outer wall 73, an inner wall 75 and a back wall 77 of main body 72 enclose open channel 76. Main body 72 and/or coolant duct covering 74 are preferably injection molded, in particular from a thermoplastic polymer. By attaching coolant duct covering 74 to main body 72, annular open channel 76 is closed, thereby forming coolant duct 64'.

In the embodiment depicted in FIG. 4a, heat exchanger 54' is a separate unit attachable to pump 52. It has to be understood however, that it is within the scope of all aspects of the present invention that a heat exchanger having a coolant duct closed off from a cavity of a pump that houses a stator, i.e. wherein coolant is not in direct contact with the stator, is formed as an integral part of a housing of the pump. Such alternative embodiments may particularly be advantageous because they allow the housing of the pump to be manufactured simultaneously with the heat exchanger.

As further depicted in FIG. 4a, main body 72 of heat exchanger 54' forms an inner surface 78 enclosing a central opening 80. Inner surface 78 provides a contact surface to establish thermal contact to pump 52. Central opening 80 is shaped to receive pump 52 therein, so that pump 52 and heat exchanger 54' can be attached to each other to form pump assembly 50'. In other words, central opening 80 forms a coupling portion for coupling heat exchanger 54' and pump 52. In the embodiment of FIG. 4b, motor housing 82 is screwed onto a pump chamber housing 84 such that heat exchanger 54' is clamped therebetween. Alternatively or additionally, in all aspects of the present invention, the heat exchanger is provided with coupling means for coupling with the motor housing.

As depicted in FIG. 4b, which shows resulting pump assembly 50', pump 52 comprises a motor housing 82 and a pump chamber housing 84. In the depicted embodiment, an outer peripheral surface 83 of motor housing 82 is in direct contact with inner surface 78 of main body 72. Motor housing 82 further comprises a connector 86 for supplying power and/or control signals to the electric motor, and a cooling grill 87 formed in a frontal surface 85 for providing additional cooling of the electric motor. Pump chamber housing 84 comprises two attachment portions 86a, 86b for attaching pump assembly 50' to a respective receiving portion in a household appliance. A working fluid receiving port and a working fluid discharge port (not depicted) are also provided by pump chamber housing 84.

Inner wall 75 comprises a plurality of C-shaped segments 79, arranged so as to form a plurality of indents in inner surface 78 and a plurality of respective bulges protruding into coolant duct 64'. In some embodiments such C-shaped segments 79 enclose corresponding portions of motor housing 82, such as local reinforced segments providing bores for attachment screws. Alternatively or additionally, bulges of C-shaped segments 79 protruding into coolant duct 64' may serve as turbulators increasing an amount of turbulence in the coolant flow in heat exchanger 54', thereby increasing the coefficient of heat transfer between inner wall 75 and coolant flowing in coolant duct 64'. Likewise, and preferably when C-shaped segments 79 enclose corresponding segments in motor housing 82, a plurality of corresponding cutouts 81 is provided in coolant duct covering 74. All aspects of the present invention may advantageously benefit from the addition of one or more turbulators, such as those provided by C-shaped segments 79. It has to be understood however, that such embodiments are not limited to the particular combination of features of pump assembly 50' depicted in FIGS. 4a and 4b. Alternatively or additionally, in all aspects of the present invention, turbulators are provided in a coolant duct of a heat exchanger in the form of pyramids, wedges, triangles and/or other suitable turbulator geometries known in the art.

FIGS. 5a through 9 are schematic representations of further preferred embodiments of pump assemblies, similar to those described above. In particular, embodiments of FIGS. 5a through 9 relate to pump assemblies which further comprise at least one circuit board configured to control the pump assembly and/or other components of a household appliance, wherein the circuit board is provided to be in thermal contact with a heat exchanger. Such embodiments advantageously allow to cool the circuit board by means of coolant flowing through the heat exchanger, and/or to use waste heat generated by the circuit board for increasing energy efficiency of the system. The depicted pump assemblies and their components are suitable for use with any aspect of the present invention. In particular, the pump assemblies of FIGS. 5a through 9 are suitable for use in a heat recovery system according to the second aspect and/or in dishwasher 1, 1' as depicted in FIGS. 1 and 2. Moreover, the heat exchangers of the pump assemblies of FIGS. 5a through 9 are suitable for use with any aspect of the present invention. In particular, the depicted heat exchangers are suitable for use with the pump assemblies of FIGS. 3a through 4b.

Figure 5A:
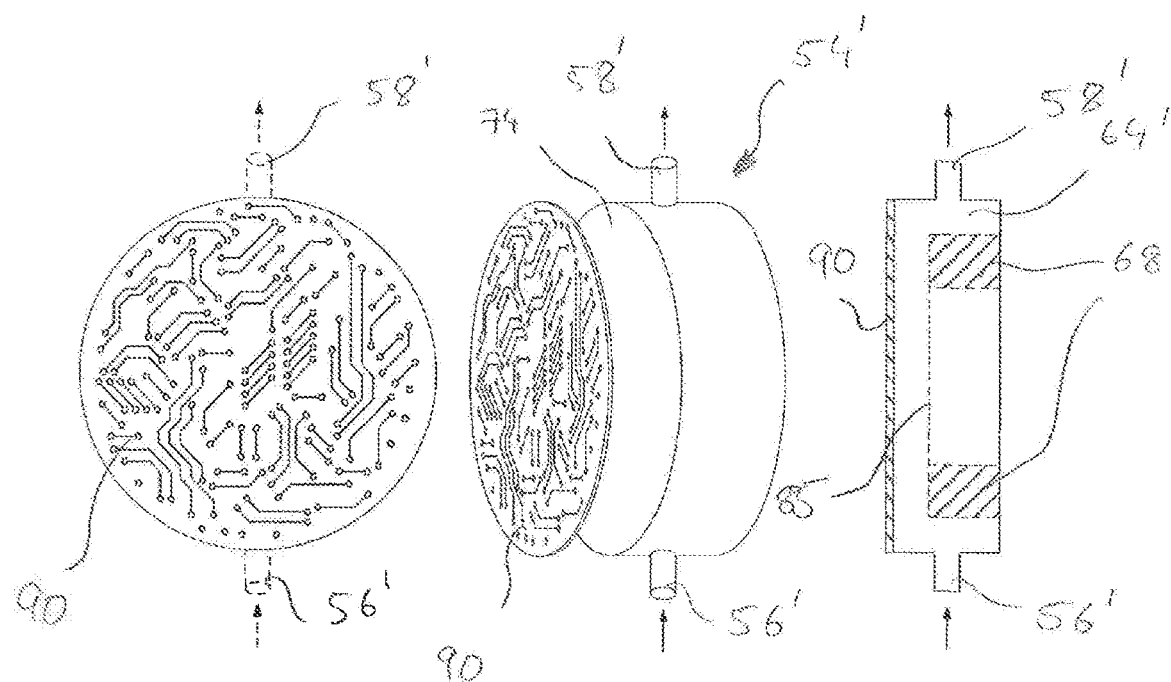
FIG. 5a shows different views of a further embodiment of a pump assembly according to the present invention.

FIG. 5a shows, from left to right, a frontal view, a perspective exploded view, and a cross-section of another embodiment of a pump assembly. A circuit board 90 is provided to be in contact with coolant duct covering 74. In the depicted embodiment, heat exchanger 54' comprises a coolant duct 64' that, in addition to outer peripheral surface 83, also covers frontal surface 85 of motor housing 82. Thus, coolant duct covering 74 is a substantially circular plate. Likewise, circuit board 90 is provided in the form of a substantially circular plate placed on top of coolant duct covering 74. The afore described design advantageously provides a contact surface between circuit board 90 and coolant duct covering 74 for establishing thermal contact between coolant flowing in coolant duct 64' and circuit board 90, the contact surface covering essentially the entire back surface of circuit board 90.

Figure 5B:
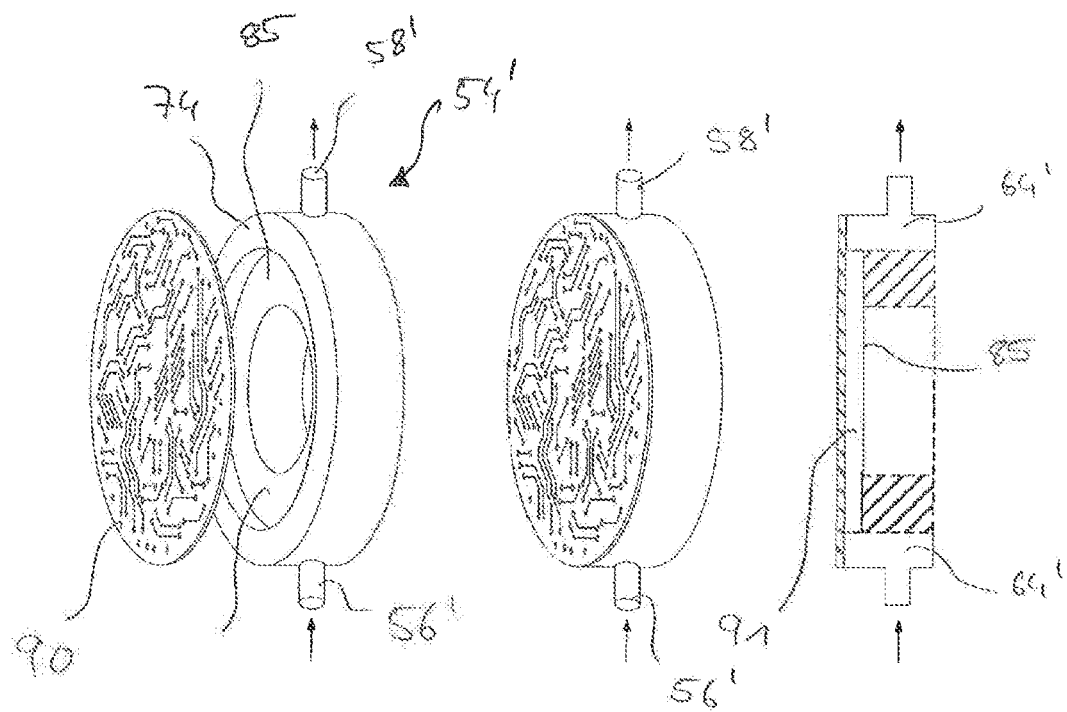
FIG. 5b shows different views of a further embodiment of a pump assembly according to the present invention.

FIG. 5b shows, from left to right, a perspective exploded view, a perspective view, and a cross-section of another embodiment of a pump assembly. The embodiment depicted in FIG. 5b is similar to the embodiment depicted in FIG. 5a, however coolant duct 64' is a substantially annular channel similar to the embodiments depicted in FIGS. 3b, 3c, 4a and 4b. The electric motor with electric motor housing 82 is placed within central opening 80 of heat exchanger 54' so that frontal surface 85 of motor housing 82 is axially recessed therein with respect to coolant duct covering 74. Circuit board 90 is attached to coolant duct covering 74, thereby forming a substantially cylindrical cavity 91 between the back surface of circuit board 90 and motor housing 82. An annular outer portion of circuit board 90, which is attached to coolant duct covering 74, is thus cooled by being in thermal contact with coolant circulating in coolant duct 64'. In other words, in the embodiment of FIG. 5b, only a portion of circuit board 90 is in thermal contact with heat exchanger 54'.

Figure 6A:
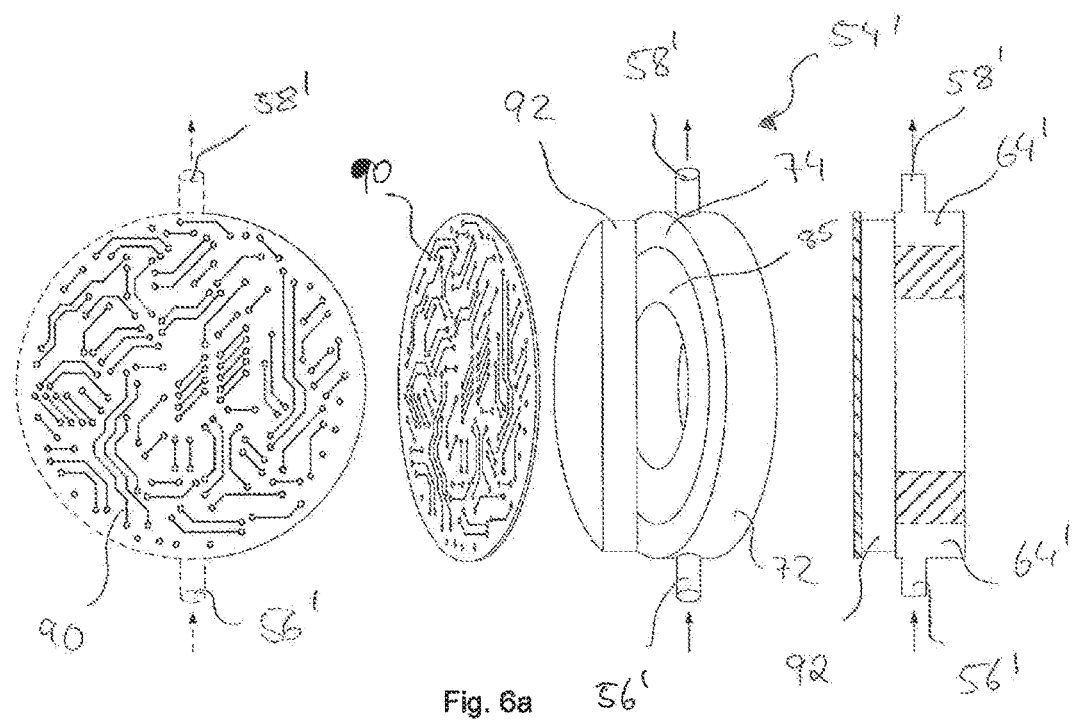
FIG. 6a shows different views of a further embodiment of a pump assembly according to the present invention.

FIG. 6a shows, from left to right, a frontal view, a perspective exploded view, and a cross-section of another embodiment of a pump assembly. The embodiment depicted in FIG. 6a is similar to the embodiment depicted in FIG. 5b, however motor housing 82 is positioned in central opening 80 so that its frontal surface 85 and coolant duct covering 74 are flush. Moreover, a semicircular heat sink 92 is attached to the surface formed by the common plane of coolant duct covering 74 and frontal surface 85. Circuit board 90 is attached with its back surface to an upper surface of heat sink 92 that is opposite the surface of heat sink 92 which attaches heat sink 92 to main body 72.

Figure 6B:
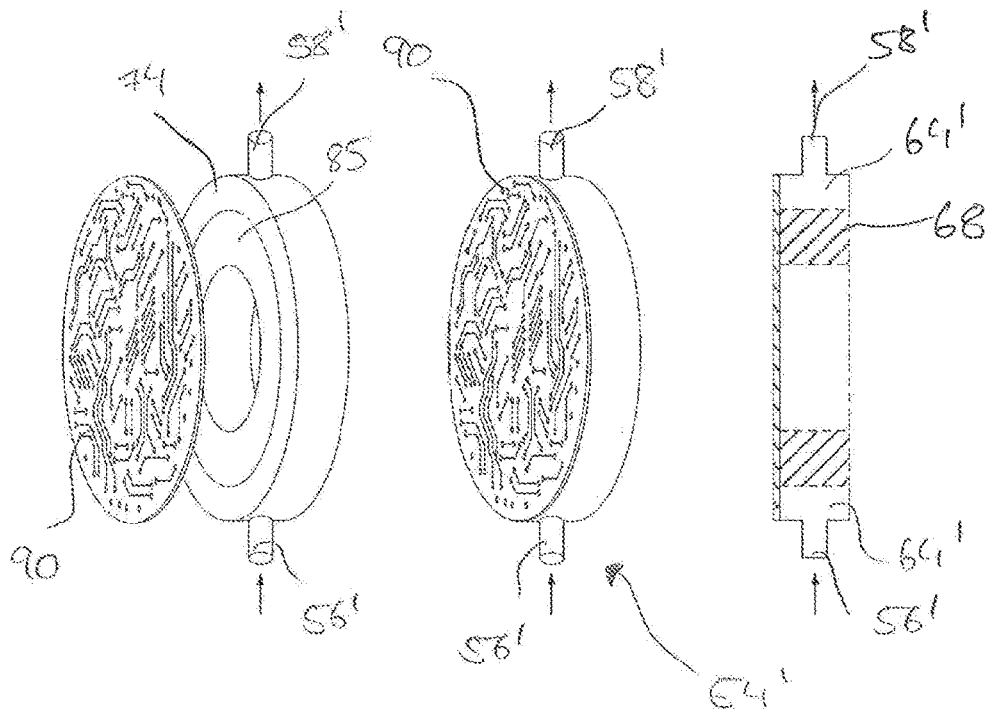
FIG. 6b shows different views of a further embodiment of a pump assembly according to the present invention.

FIG. 6b shows, from left to right, a perspective exploded view, a perspective view, and a cross-section of another embodiment of a pump assembly. The embodiment depicted in FIG. 6b is similar to the embodiment depicted in FIG. 6a, however heat sink 92 is omitted so that the back surface of circuit board 90 directly attaches to the surface formed by the common plane of coolant duct covering 74 and frontal surface 85.

Figure 7A:
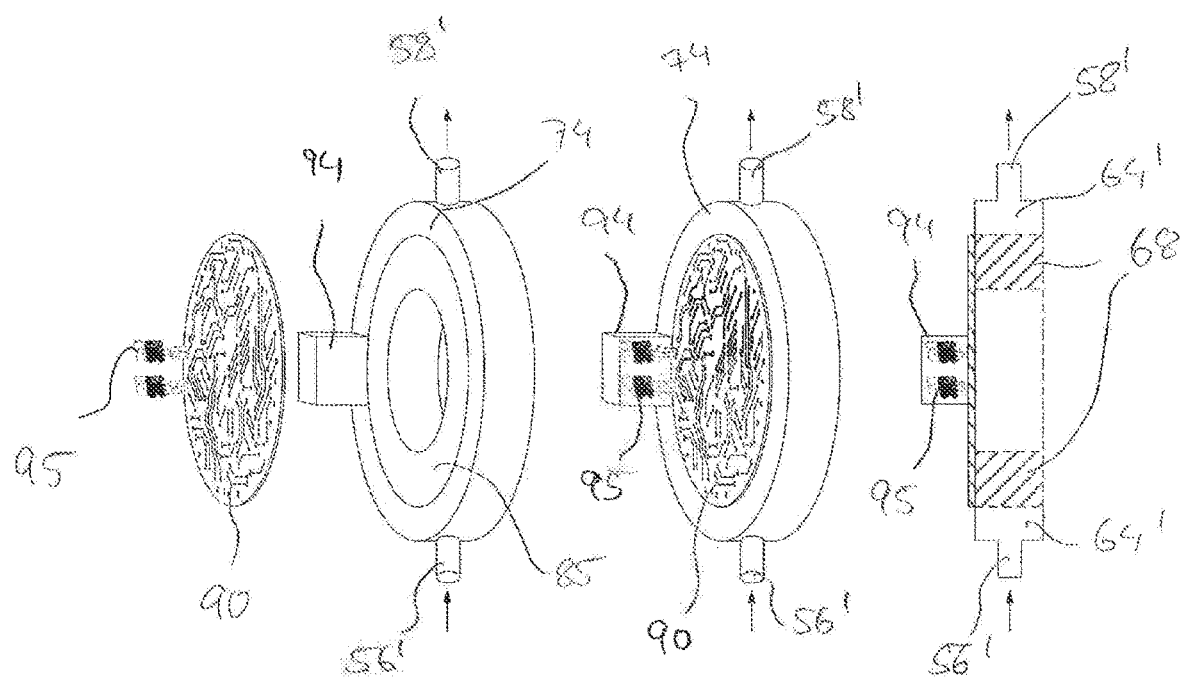
FIG. 7a shows different views of a further embodiment of a pump assembly according to the present invention.

FIG. 7a shows, from left to right, a perspective exploded view, a perspective view, and a cross-section of another embodiment of a pump assembly. The embodiment depicted in FIG. 7a is similar to the embodiment depicted in FIG. 6b, however circuit board 90 is comparatively smaller, so that its radial extent substantially corresponds to that of motor housing 82. Moreover, circuit board 90 comprises a plurality of electrical components 95 arranged at a circumference of and protruding from a top surface of circuit board 90. Heat exchanger 54' is further provided with a sectional heat sink 94, protruding from a top surface of coolant duct covering 74. Circuit board 90 is attached with its back surface to frontal surface 85 and oriented such that electrical components 95 align with and are in contact with a radially inwardly oriented side surface of sectional heat sink 94. The depicted embodiment advantageously enables selective cooling of electrical components 95.

Figure 7B:
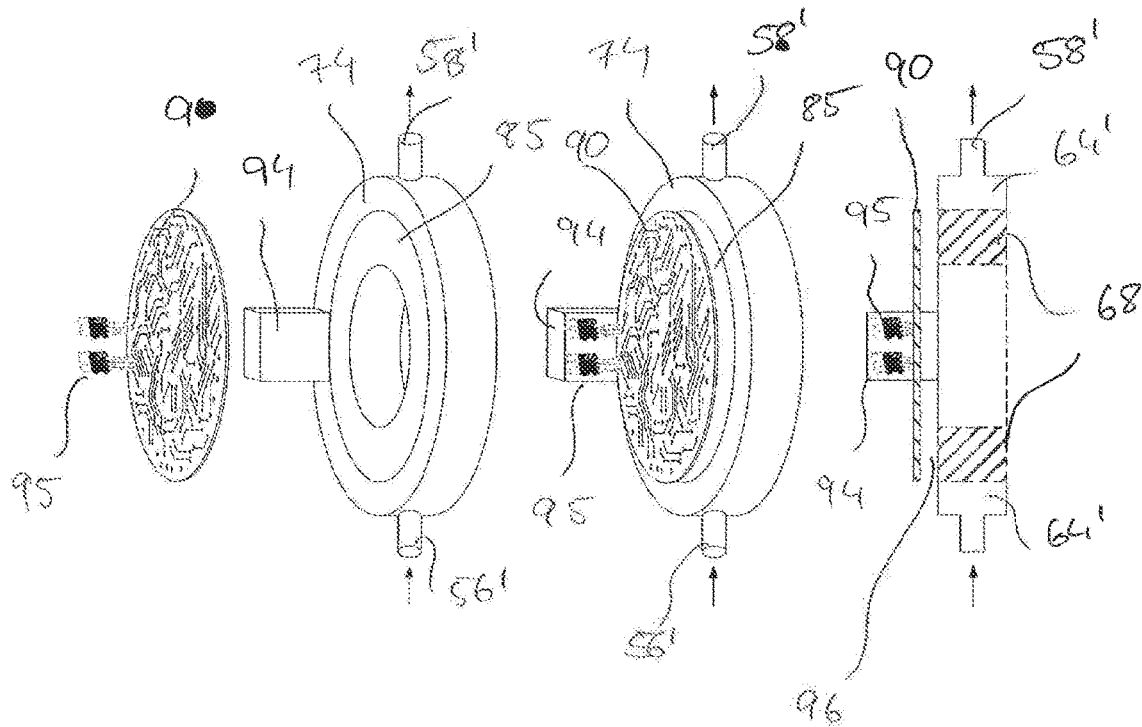
FIG. 7b shows different views of a further embodiment of a pump assembly according to the present invention.

FIG. 7b shows, from left to right, a perspective exploded view, a perspective view, and a cross-section of another embodiment of a pump assembly. The embodiment depicted in FIG. 7b is similar to the embodiment depicted in FIG. 7a, however circuit board 90 is attached to heat exchanger 54' only via sectional heat sink 94. Thereby, the back surface of circuit board 90 is distanced from frontal surface 85 so as to form a gap 96.

Figure 8A:
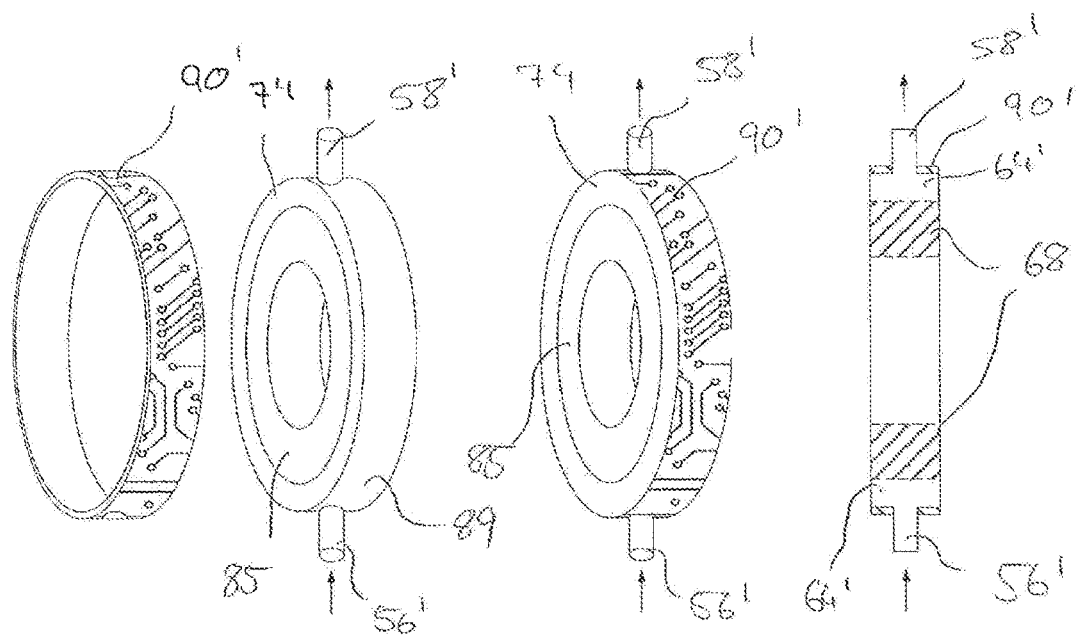
FIG. 8a shows different views of a further embodiment of a pump assembly according to the present invention.

FIG. 8a shows, from left to right, a perspective exploded view, a perspective view, and a cross-section of another embodiment of a pump assembly. The embodiment depicted in FIG. 8a is similar to the embodiment depicted in FIG. 6b, however a circuit board 90' that forms a substantially cylindrical shell is provided instead of circuit board 90 of FIG. 6b. Circuit board 90' is attached to an outer peripheral surface 89 of heat exchanger 54'. This particular arrangement may advantageously enable to conform with demanding spatial constraints posed by a household appliance. Alternatively, a substantially planar circuit board, such as circuit board 90 of FIG. 6b may be attached to outer peripheral surface 89. In such embodiments, outer peripheral surface 89 preferably comprises a radial protrusion forming a flat attachment surface for circuit board 90.

Figure 8B:
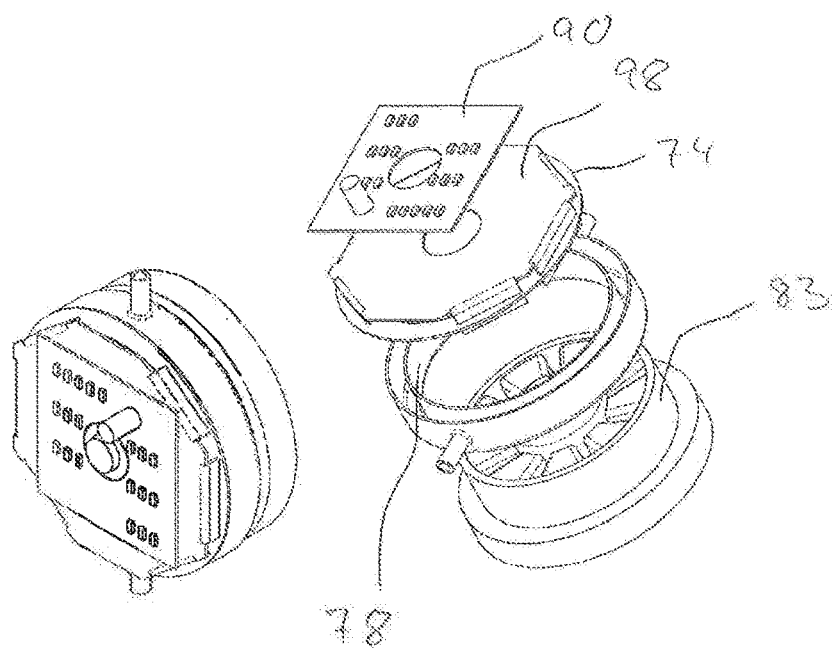
FIG. 8b shows different views of a further embodiment of a pump assembly according to the present invention.

FIG. 8b shows, from left to right, a perspective view and a perspective exploded view of another embodiment of a pump assembly. The embodiment depicted in FIG. 8b is similar to the embodiment depicted in FIG. 6b, with the addition of a conductive intermediate layer 98 placed between coolant duct covering 74 and circuit board 90.

Figure 9:
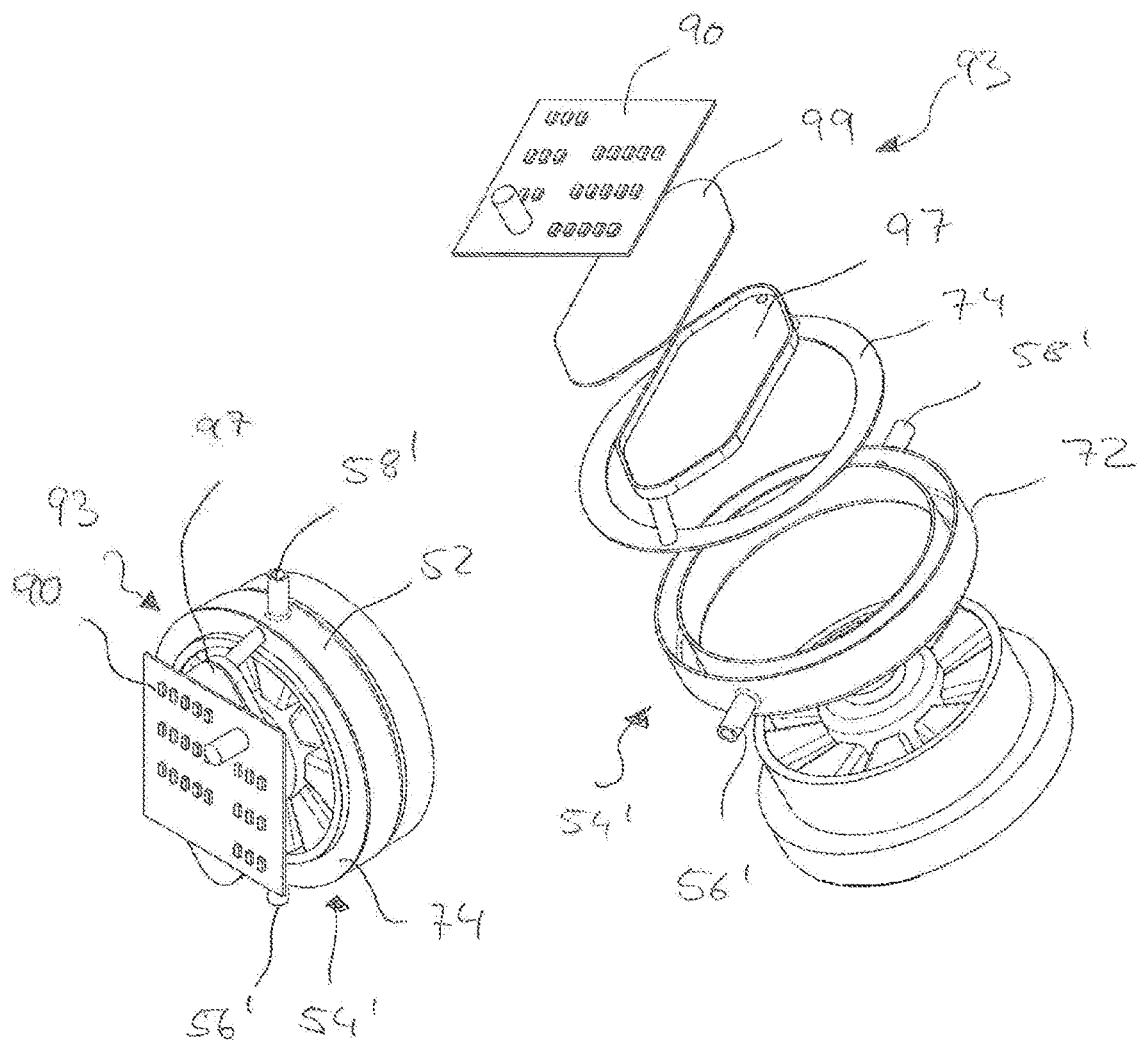
FIG. 9 shows different views of a further embodiment of a pump assembly according to the present invention.

FIG. 9 shows, from left to right, a perspective view and a perspective exploded view of another embodiment of a pump assembly. The embodiment depicted in FIG. 9 is similar to the embodiment depicted in FIG. 8b, with the addition of a secondary heat exchanger 93. Circuit board 90 is attached with its back surface to a secondary cooling duct covering 99 attached to a secondary main body 97. The assembly of secondary coolant duct 99 and secondary main body 97 forms secondary heat exchanger 93. As can be inferred from FIG. 9, secondary main body 97 comprises a secondary inlet duct extending through coolant duct covering 74 proximate coolant inlet 56'. Likewise, secondary main body 97 comprises a secondary outlet duct extending through coolant duct covering 74 proximate coolant outlet 58'. Thus, secondary heat exchanger 93 forms a flow path that is parallel to the flow path of coolant duct 64' in heat exchanger 54'. The depicted embodiment advantageously allows to adapt secondary heat exchanger 93 particularly to the cooling needs of circuit board 90, while heat exchanger 54' can independently be adapted to the particular cooling needs of pump 52.

REFERENCE SIGNS 1, 1' dishwasher
10 dishwashing compartment
11 drainage pump
12a upper spray arm
12b central spray arm
12c bottom spray arm
13 drainage pipe
14 sump
15 water drained to external drainage
16 circulation pump
17a upper riser pipe
17b lower riser pipe
18 diverter
19 connector pipe
20 airgap
21 freshwater received from freshwater supply
22 main fluid inlet
24 main fluid outlet
26 valve
27 water entering supply line 32
28 secondary fluid outlet
29 water exiting return line 32
30 secondary fluid inlet
32 supply line
34 heat exchanger
36 return line
38 lower portion
40 upper portion
42 coolant pump
50, 50' pump assembly
52 pump
54, 54' heat exchanger
56, 56' coolant inlet
58, 58' coolant outlet
60 coolant entering heat exchanger 54, 54'
62 coolant exiting heat exchanger 54, 54'
64, 64' coolant duct
64a first branch of coolant duct 64'
64b second branch of coolant duct 64'
68 stator
70 rotor housing
72 main body
73 outer wall
74 coolant duct covering
75 inner wall
76 open channel
77 back wall
78 inner surface
79 C-shaped segment
80 central opening
81 cutout 82 motor housing
83 outer peripheral surface
84 pump chamber housing
85 frontal surface
86 connector
86a, 86b attachment portions
87 cooling grill
89 outer peripheral surface
90, 90' circuit board
91 cavity
92 heat sink
93 secondary heat exchanger
94 sectional heat sink
95 electrical components
96 gap
97 secondary main body
98 conductive intermediate layer
99 secondary coolant duct
100 main fluid circuit
200, 200' heat exchange circuit

The invention claimed is:

1. Pump assembly for use in a household appliance, the pump assembly comprising:
   at least one pump;
   an electric motor comprising a rotor and a stator, the electric motor being configured to drive the pump for pumping a working fluid through a main fluid circuit of the household appliance; and
   at least one heat exchanger for transferring heat from the electric motor to a liquid coolant circulating in a heat exchange circuit of the household appliance, the at least one heat exchanger comprising at least one coolant inlet, at least one coolant outlet and at least one coolant duct for the liquid coolant extending between the coolant inlet and the coolant outlet;
   wherein the at least one heat exchanger is arranged such that the coolant duct is in thermal contact with at least a portion of the stator for transferring heat form the stator to the liquid coolant;
   wherein the working fluid is graywater and the liquid coolant is freshwater supplied from a freshwater source;
   wherein the coolant duct forms a substantially annular channel enclosing the stator;
   wherein the coolant duct branches off into a first branch and a second branch downstream of the coolant inlet;
   wherein the first branch is a substantially semicircular pipe segment arranged to enclose a first half of the stator and the second branch is a substantially semicircular pipe segment arranged to enclose a second half of the stator; and
   wherein the first and second branch rejoin upstream of the coolant outlet such that a flow of coolant entering the heat exchanger through the coolant inlet is divided into two parallel coolant streams, one through each of the first and second branches, before rejoining downstream of the coolant outlet through which the entire flow of coolant stream exits the heat exchanger.

2. Pump assembly of claim 1, the heat exchanger further comprising a main body portion providing at least a portion of the coolant duct.

3. Pump assembly of claim 2, wherein the main body portion also provides the coolant inlet and the coolant outlet.

4. Pump assembly of claim 2, wherein the main body portion is injection molded.

5. Pump assembly of claim 4, wherein the main body portion is injection molded from a thermoplastic polymer.

6. Pump assembly of claim 1, wherein the heat exchanger is provided as a separate unit which is attached to a housing of the electric motor.

7. Pump assembly of claim 1, wherein the heat exchanger is provided as an integral part of a housing of the electric motor.

8. Pump assembly of claim 1, further comprising a control unit provided in thermal contact with the heat exchanger.

\* \* \* \* \*